March 8, 1966     H. K. MACINTOSH     3,238,736
LIQUID NITROGEN FREEZING SYSTEM
Filed May 16, 1963
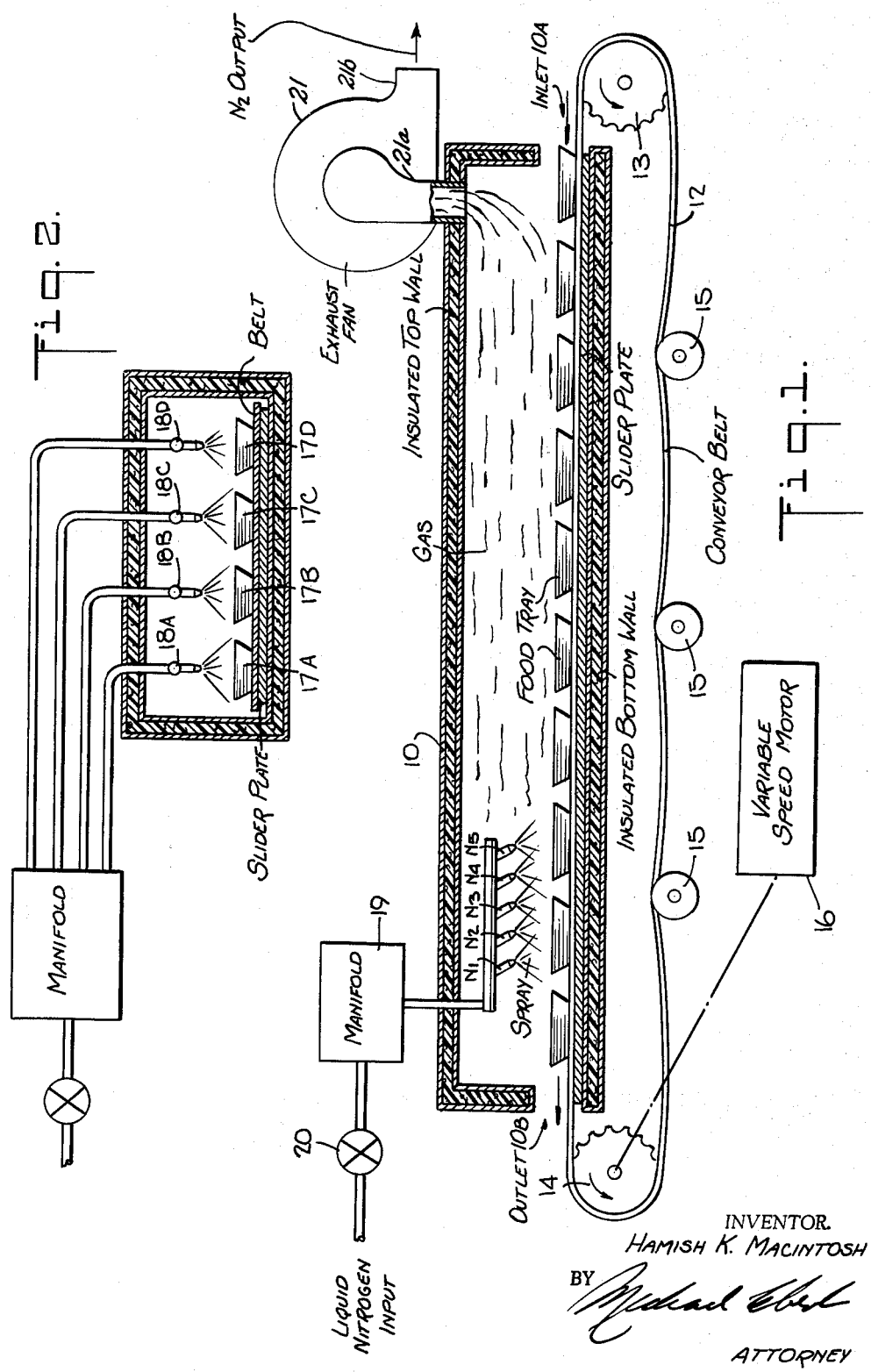
INVENTOR.
HAMISH K. MACINTOSH
BY
ATTORNEY

# United States Patent Office 3,238,736
Patented Mar. 8, 1966

3,238,736
LIQUID NITROGEN FREEZING SYSTEM
Hamish K. Macintosh, Toronto, Ontario, Canada, assignor to Elmwood Liquid Products, Inc., New York, N.Y., a corporation of New York
Filed May 16, 1963, Ser. No. 280,781
2 Claims. (Cl. 62—63)

This invention relates generally to techniques for the quick freezing of perishables, and more particularly to a system for continuously conveying perishables through a thermally-insulated duct wherein the perishables are sprayed with liquid nitrogen, the system being characterized by working components which lie outside of the freezing zone and hence operate efficiently.

The conventional method of freezing perishables, such as meats, fish, vegetables, pies and the like, is to expose the food in a wind tunnel to a blast of cold, relatively dry air. Wind-tunnel freezing requires a prolonged cooling period, lasting several hours, and giving rise to substantial evaporation of moisture and light volatile oils from the food. The loss of moisture and of the volatile oils impairs the taste of the food, for these ingredients to a degree determine the flavor and aroma of the product. Thus when the food is later unfrozen and heated, it lacks the quality and taste of freshly cooked food. Also, since freezing takes place slowly in air, some discoloration of the food occurs, which further degrades the quality of the product.

The use of liquid nitrogen to effect quick freezing is known. The temperature of liquid nitrogen, which is 320° below zero, is far colder than Dry Ice, the coldest substance presently used by the food industry. This freezing agent can bring food down from cooking temperatures to a completely frozen state in a matter of minutes. The water and oils within the food are frozen with such rapidity that no loss of flavor is experienced, and food passes the crystallization point so quickly that the original texture thereof is maintained. Thus the exceptionally fast freezing carried out by liquid nitrogen serves to lock in the flavor and to retain all the elements that distinguish freshly cooked foods from food which must stand for hours before finally reaching a frozen state. Moreover, since the water content is retained, it prevents the food from becoming dry and flaky.

Despite the distinct advantages inherent in freezing with liquid nitrogen, this process has not been generally put to use because of serious practical diffculties encountered in carrying out such freezing on a commercial basis. The extremely low temperatures involved tend to freeze up the mechanisms and components heretofore used and to render the system inoperative. Moreover, where the liquid nitrogen is dripped on food having a delicate texture or a thin crust, or makes direct contact therewith, it will in many cases bore through the food or crack the crust and thereby mar its appearance.

Accordingly, it is the main object of this invention to provide an efficient, reliable, and low-cost system using liquid nitrogen for quickly freezing perishables.

More specifically, it is an object of the invention to provide a system in which the perishables are conveyed continuously through a thermally insulated tunnel where they pass successively through a pre-cooling and a freezing zone, the drive mechanism for the conveyor and all other working components being removed from these zones to prevent frost build-up and the freezing of mechanical parts.

A significant advantage of the invention is that the liquid nitrogen fed into the system is entirely vaporized in the course of freezing, so that there is no need to store or pump the residual liquid nitrogen that might otherwise exist.

Also an object of the invention is to provide a freeze-down system in which freshly cooked food is transported on a continuous belt through an open-ended tunnel, where in a zone adjacent the inlet side thereof the food is pre-cooled by nitrogen gas derived from the vaporization of nitrogen liquid occurring in a zone adjacent the outlet side where the food is sprayed therewith, thereby effecting an operating economy in the use of nitrogen.

Still another object of the invention is to provide a system of the above type in which the flow of liquid nitrogen, the degree and rate of cooling, and all other factors involved in freezing down cooked food, may be readily controlled to attain optimum freezing conditions.

Briefly stated, these objects are accomplished by means of an open-ended, elongated tunnel having a relatively small aperture to reduce gas losses, food being conveyed continuously therethrough from the inlet opening to the outlet opening, the food in a freezing zone adjacent the outlet opening being sprayed with liquid nitrogen at a rate which is so controlled as to cause the liquid nitrogen to volatilize upon contact with the food, suction means being provided to draw the resultant nitrogen gas toward the inlet opening of the tunnel to effect pre-cooling of the food before it enters the freezing zone.

For a better understanding of the invention, as well as other objects and further features thereof, reference is made to the following detailed description to be read in conjunction with the accompanying drawing, wherein:

FIG. 1 schematically shows, in longitudinal section, a liquid nitrogen freezing system in accordance with the invention; and FIG. 2 shows the system in end view.

Referring now to the drawing, the system in accordance with the invention comprises an elongated, open-ended tunnel or duct 10 of rectangular cross-section, the walls of the duct incorporating suitable thermal insulation, such as foam polyurethane plastic of the type used in refrigerators. Perishables are conveyed through the duct by means of a conveyor constituted by a continuous belt 12 which is looped through the duct and is supported between two sprocket wheels 13 and 14.

Sprocket wheel 13 is positioned on suitable bearings adjacent the inlet side 10A of the duct, whereas sprocket wheel 14 is supported on bearings adjacent the outlet side 10B of the duct. The upper portion of the continuous belt 12 is arranged to run in a straight line through the duct adjacent the bottom wall thereof, whereas the lower portion of the belt is exterior to the duct, and is loosely supported on idler rolls 15 intermediate the main sprocket wheels.

The conveyor is driven by a suitable variable-speed motor 16 operatively coupled to the sprocket wheel 14, whereby the speed of conveyance may be readily adjusted. The belt may be of the chain link type, and serves to convey, in the example shown, four rows of food platters 17A, 17B, 17C and 17D, through the duct. The platters may be of plastic, paper, metal or any other suitable material, and are filled with cooked meat, fish, or other perishables. It is to be understood that the invention is useable for freezing a variety of foods ranging in type from so-called "TV Dinners," pies and baked goods, to fresh fruits, vegetables, meats and fish. The unfrozen platters or trays are placed on the conveyor either manually or by automatic means at the inlet side thereof, and are picked off the conveyor in the frozen state at the outlet side.

In the tunnel 10, which is supported horizontally above ground, the end portion adjacent the outlet side 10B, which constitutes about one-third of the total length of the tunnel, acts as a freezing zone. In this zone the rows of moving food trays 17A to 17D, which arrive from the inlet side 10A, are sprayed with liquid nitrogen from correspondingly positioned headers 18A, 18B, 18C and 18D.

Each header, such as header 18D, as shown in FIG. 1, is provided with a series of spaced nozzles $N_1$, $N_2$, $N_3$, etc., from which liquid nitrogen is ejected in the zone path aligned with a food row. The several headers are coupled to a common manifold 19 which is supplied with liquid nitrogen from a suitable tank (not shown) through a control valve 20. While four food rows and four headers are shown, it is to be understood that this number is purely illustrative, and a greater or smaller number may be used in practice.

The spray of liquid nitrogen is adjusted relative to the quantity and temperature of food passing thereunder and to the rate of passage, whereby all of the liquid is boiled and volatilized in the course of freezing the food to produce cold nitrogen gas. The conversion to gas is preferably upon contact with the food surface to prevent drip effects. This gas is sucked down-tunnel in the direction of the inlet 10A in heat-exchange relationship with the food being conveyed toward the freezing zone, by means of one or more suction fans 21. The fan is provided with an input 21a which communicates with the duct 10 adjacent the inlet, the nitrogen gas drawn from the duct being discharged through an output pipe 21b. This discharged gas, which is still quite cold, may be used to carry out other cooling operations in the food processing plant, such as pre-cooling of gravy for use in the food, or it may be reliquified for re-use in the system. Alternatively, it may be wasted into the atmosphere, if warranted by low nitrogen costs.

The cold gas which is sucked down the tunnel 10 acts to pre-chill the food before it advances into the freezing zone, hence the remaining two-thirds of the tunnel serves as a pre-cooling zone, whereby as the food is conveyed from inlet to outlet, it is progressively cooled in temperature until it reaches the freezing zone, where a further and abrupt reduction in temperature takes place. The duct height dimensions are such as to provide relatively small end apertures so that very little nitrogen is wasted from either end. Further savings, if desired, may be effected by suitable end gas locks operating in conjunction with the conveyor, to admit the food trays.

While the upper portion of the chain belt travels through the freezing and pre-cooling zones in the duct, frost is not permitted to build up on the conveyor, for it passes outside of the duct and is heated to the ambient temperature before being returned to the duct. As noted before, the drive mechanism for the conveyor is also removed from the interior of the duct, as is the suction motor. Hence the working parts are not subject to interference from freezing, with resultant mechanical problems.

Obviously, the hotter the food in its initial state, and the larger the quantities thereof, the more liquid nitrogen must be used at a given conveyor speed. The speed may readily be controlled by the variable motor drive, and the flow adjusted by the valve, to achieve optimum freezing conditions for any given food load.

It will be appreciated that food frozen in the system described herein, when later heated, as in a high-frequency oven, will have the desired "just cooked" quality and will exhibit a highly appetizing aroma, color and flavor.

While there has been shown what is considered to be a preferred embodiment of the invention, it will be appreciated that many changes and modifications may be made therein without, however, departing from the essential spirit of the invention as defined in the annexed claims.

What is claimed is:

1. The method of freezing perishables whose bodies are susceptible to physical injury when subjected to liquid nitrogen, comprising the steps of:
   (a) advancing the perishables to be frozen through an elongated tunnel from an open inlet therein to an open outlet,
   (b) subjecting the perishables at a position in said tunnel adjacent said outlet to liquid nitrogen to effect freezing of said perishables and to cause said liquid nitrogen to volatilize and thereby form a cold gas,
   (c) and forcing substantially all of said cold gas toward said inlet in countercurrent relationship to the perishables and in heat exchange relationship therewith to effect progressive pre-cooling of said perishables as they advance toward said outlet to an extent preventing said perishables from being subjected to a physically injurious change in temperature when exposed to said liquid nitrogen, thereby to derive maximum benefit from the liquid and gaseous nitrogen and to avoid an abrupt transition in the internal temperature of said perishables.

2. The method set forth in claim 1, wherein said tunnel is of substantially uniform cross-section throughout its length.

References Cited by the Examiner
UNITED STATES PATENTS

| | | | |
|---|---|---|---|
| 1,933,257 | 10/1933 | Goosman | 62—63 |
| 2,424,870 | 7/1947 | Welling | 62—64 |
| 2,447,249 | 8/1948 | Hill | 62—63 |
| 2,484,297 | 10/1949 | Klein | 62—330 |
| 2,920,462 | 1/1960 | Roser et al. | 62—374 |
| 2,951,353 | 9/1960 | Morrison | 62—63 |
| 2,964,412 | 12/1960 | Morrison | 99—194 |
| 2,978,336 | 4/1961 | Morrison | 99—192 |
| 3,022,636 | 2/1962 | Morrison | 62—64 |
| 3,023,588 | 3/1962 | Morrison | 62—64 |
| 3,039,276 | 6/1962 | Morrison | 62—64 |
| 3,048,989 | 8/1962 | Morrison | 62—64 |

EDWARD J. MICHAEL, *Primary Examiner.*

HYMAN LORD, *Examiner.*